United States Patent Office 3,833,547
Patented Sept. 3, 1974

3,833,547
POLYDODECAMETHYLENE TEREPHTHALAMIDE COPOLYAMIDE
Alfred Steitz, Jr., deceased, late of Batavia, Ill., by Margaret Marie Steitz, executrix, Batavia, Ill., assignor to Standard Oil Company, Chicago, Ill.
No Drawing. Filed Oct. 20, 1970, Ser. No. 82,522
Int. Cl. C08g 20/20
U.S. Cl. 260—78 R                         10 Claims

ABSTRACT OF THE DISCLOSURE

Polydodecamethylene terephthalamide copolymers and fibers prepared therefrom are disclosed. These copolymers are prepared by heating dodecamethylene diammonium terephthalate in an aqueous solution with dodecamethylene diammonium salts of modifying acid such as isophthalic acid, hexahydroterephthalic acid or 5-tertiary-butylisophthalic acid. These fibers, when woven into fabric, have improved aethestics and wash and wear properties.

---

The following novel copolymers: poly(dodecamethylene terephthalamide - dodecamethylene isophthalamide), poly(dodecamethylene terephthalamide - dodecamethylene hexahydroterephthalamide) and poly(dodecamethylene terephthalamide-dodecamethylene t-butylisophthalamide) were prepared from mixed dodecamethylene diammonium salts of terephthalic acid and a modifying acid such as isophthalic acid, hexahydroterephthalic acid, and 5-tertiary-butylisophthalic acid by reacting these acids with 1,12-diaminododecane in an aqueous medium. The reaction is carried out by combining the two pure C–12 diamino salts, suitably the water soluble dodecamethylene salt of isophthalic acid, hexahydroterephthalic acid or 5-tertiary-butylisophthalic acid and the slightly water soluble dodecamethylene salt of terephthalic acid in the presence of water. The temperature of the resulting mixture is raised until both salts are in solution and the homogeneous mixture of mixed salts is obtained. This solution of the mixed salts is ready for polymerization to produce high molecular weight poly(dodecamethylene terephthalamide-dodecamethylene isophthalamide), poly-(dodecamethylene terephthalamide-dodecamethylene hexahydroterephthalamide) and poly(dodecamethylene terephthalamide - dodecamethylene t-butylisophthalamide) copolymers. These copolymers may be melt spun to produce a fiber with a pleasant silk-like appearance and hand. These copolymers also have a high glass transition point and a high modulus and are useful in the preparation of fabric for wash and wear applications.

Novel high molecular weight fiber-forming poly(dodecamethylene terephthalamide) copolymers having a glass transition temperature above 100° C. comprising essentially recurring units of (a) dodecamethylene terephthalamide and (b) a modifying amide selected from the group consisting of dodecamethylene isophthalamide, dodecamethylene t-butylisophthalamide and dodecamethylene hexahydroterephthalamide wherein the polymer contains 75 to 95 mol percent dodecamethylene terephthalamide structures and 25 to 5 mol percent of structures selected from the group consisting of dodecamethylene isophthalamide, dodecamethylene t-butylisophthalamide and dodecamethylene hexahydroterephthalamide have been prepared. These copolymers can be converted into fibers, filaments, films and shaped structures. The process for preparing these fiber-forming poly(dodecamethylene terephthalamide) copolymers having a glass transition about 100° C. comprises heating a homogeneous solution of mixed diammonium salts in an aqueous medium comprising 75 to 95 mol percent of dodecamethylene diammonium terephthalate and 25 to 5 mol percent of a diammonium salt selected from the group consisting of dodecamethylene diammonium isophthalate, dodecamethylene diammonium hexahydroterephthalate, dodecamethylene diammonium t-butylisophthalate, prepolymerizing said mixed salts under autogeneous pressure at a temperature of about 230° C. held until substantially all of the water has been removed and then polycondensing at a temperature of about 310 to 340° C.

It has been known that linear polyterephthalamides are high melting, highly crystalline materials. In general they melt above the normal range required for melt spinning into fibers unless the diamine portion has 12 or more methylene groups. The crystalline melting point of poly-(dodecamethylene terephthalamide) has been reported to be 296° C. by A. J. Yu and R. D. Evans, J. Polymer Science 42, 249–257 (1960). Conventional melt spinning of fibers is not considered to be practical much above 300° C. since nylon polymerization continues and it becomes more difficult to spin the material. We have found that poly(dodecamethylene terephthalamide) can be spun into fibers in spite of its relatively high melting point as compared to nylon 6,6 (265° C.). However, the fibers were highly crystalline and very brittle. Attempts to draw the filaments into strong, oriented fibers were unsuccessful by conventional methods. The spun fiber crystallized so rapidly that it would not draw but remained a weak unoriented crystalline material. For instance, monofilaments melt spun from poly(dodecamethylene terephthalamide) were drawn 2.2 times over a heated shoe at 175° C., had a tenacity of only 1.9 g. per denier and had an elongation at break of 20%. Attempts to draw these monofilaments with a static load in an oven at temperatures of 100–250° C. have also been unsuccessful. However, it has been unexpectedly found that poly(dodecamethylene terephthalamide-dodecamethylene isophthalamide), poly(dodecamethylene terephthalamide-dodecamethylene hexahydroterephthalamide), and poly(dodecamethylene terephthalamide - dodecamethylene t-butylisophthalamide) copolyamides crystallize slowly enough to allow drawing by conventional methods. Furthermore, these materials have lower melting points and slower rates of crystallization than the unmodified poly(dodecamethylene terephthalamide). When these copolymers were melt spun at about 310–340° C. into a 16 filament yarn and drawn four times their original lengths over a hot plate at about 175° C. they gave filaments of about 6 gram per denier tensile strength. These copolymers have high glass transition temperature, about 120–180° C., and melting points between 240° and 300° C.

These copolyamides consist of "modified" poly(dodecamethylene terephthalamide). The term "modification" refers to the fact that the polymer molecule is randomly modified by replacing from 5–25 mol percent of the terephthalic acid with either isophthalic acid, hexahydroterephthalic acid, or 5-tertiary-butylisophthalic acid.

It is necessary in nylon technology to add a slight excess of the amine or the acid to the nylon salt during polymerization so that the polycondensation will not be able to proceed beyond a certain degree determined by the equilibrium even with prolonged heating. This additive is commonly acetic acid but may be an organic acid or amine. The additive is called a "molecular weight stabilizer" or "viscosity stabilizer." Herein one of the components of the amine salt, usually isophthalic acid, was employed as a stabilizer. It should be noted that the stabilizer does not affect the fundamental transition properties of the polymer whereas modification does alter melting point and glass transition temperatures.

In a preferred embodiment the mixed salt is prepared by dissolving 75–95 parts dodecamethylene diammonium salt of terephthalic acid prepared as shown in Example I in a solution of 25–5 parts of the dodecamethylene diammonium salt of isophthalic acid or any of the other modifying acids, for example, hexahydroterephthalic acid, or 5-tertiary-butylisophthalic acid in 100 parts by weight of water. This mixed dodecamethylene diammonium salt slurry is then heated to about 140 to 160° C. at which temperature a mixed dodecamethylene diammonium terephthalate salt solution is formed. This solution contains 75 to 95 mol percent dodecamethylene diammonium salt of terephthalic acid and 25 to 5 mol percent dodecamethylene diammonium salt of isophthalic acid, hexahydroterephthalic acid or the 5-tertiary-butylisophthalic acid.

This solution is then used to prepare the following copolymers: poly(dodecamethylene terephthalamide - dodecamethylene isophthalamide), poly(dodecamethylene terephthalamide-dodecamethylene t-butylisophthalamide) and poly(dodecamethylene terephthalamide-dodecamethylene hexahydroterephthalamide). The modified poly(dodecamethylene terephthalamide) polyamides of this invention are particularly useful for the production of high tenacity yarns for textile applications, but could also be applicable for industrial uses such as tire cord, rope, belt replacement, and other laminates. The filament may be used alone or blended with other synthetic or natural fibers. They can be spun on a variety of cross-sections or co-spun with a variety of synthetic polymeric materials to alter the surface of the fiber or the crimping and texturizing properties. These copolyamides would be of particular usefulness in film and molding application where high heat distortion properties are desirable.

In the preferred embodiment for the polymerization about 90 parts by weight of the dodecamethylene diammonium salt of terephthalic acid is added to about 110 parts by weight of an aqueous solution containing 10 parts by weight of the dodecamethylene diammonium salt of isophthalic acid. This solution is heated to about 160° C. with slow stirring, then prepolymerized at a temperature of about 230° C. for about 30 to 75 minutes while removing water and polycondensed at about 310 to 340° C. for about 30 to 60 minutes. The product had a good appearance and had an inherent viscosity of between 0.7 and 0.9. It had a glass transition temperature of about 180° C. and a crystalline melting point of 280–288° C.

Multi-filament yarns were melt spun from these copolymers. The samples were extruded through a 16-orifice, 12-mil spinneret at a melt temperature of about 320° C. and drawn over a heated shoe at 190–195° C.

The copolymers were drawn at ratios of between 2.5 and 4. The denier per fiber was between 5.3 and 8.6, the tenacity in grams per denier were 3.2 to 5.9 and the percent elongations at break were 14 to 55 and the moduli (grams per denier) were 41 to 57. These new fibers have good wash-wear properties and good resilience, crispness and silk-like hand. The appearance and hand of the fibers may be varied within limits by mechanically altering luster, cross-section, and texture of the fiber. However, the property of the initial modulus of a fiber is determined by the chemical nature of the polymer molecule. For the most part, fibers in apparel, in household items, and in many industrial uses are elongated during use by only a small amount. In such cases only the initial portion of the stress-strain curve need be considered.

In a typical stress-strain curve silk possesses greater initial slope (or modulus) than man-made fibers, particularly nylon. The initial modulus of a fiber is reflected in the resilience of the fiber. The crispness of silk and ability to rebound when crushed in the hand are a result of its high resilience. As is known, nylon 6,6 is a "flat" or "dead" fiber in that it exhibits poor ability to rebound when crushed. The resilience describes the ability of a fiber to absorb work elastically, that is, without undergoing permanent deformation. This property is related to the area under the initial straight-line portion of the stress-strain curve and can be considered as the energy of elastic deformation.

The initial modulus of poly(dodecamethylene terephthalamide-dodecamethylene isophthalamide) copolymer is about 41 to 57 grams per denier. For nylon 6,6 it varies between 16 and 37 grams per denier while for silk it runs from 47 to 113 grams per denier. These novel copolymers may be considered to be high resilience nylons since their resilience qualities approach those of a polyester, for example, the modulus of Dacron varies between 27 and 90 grams per denier. It is the resilience of the material that gives it a silk-like appearance or hand.

Good wash-wear properties of a fiber are associated with glass transition temperatures of about 100° C. This is because a fiber will retain a crease and will not wrinkle at temperatures below their glass transition temperature. These novel copolymers have high glass transition temperatures of the order of 180° C. These fibers prepared from the novel copolymers also exhibit excellent modulus and tenacity. In addition, they have very good dyeability. These fibers may be dyed in dyes classified as acidic, basic, disperse, etc.

Certain variations in preparation procedures could conveniently be employed and still fall within the scope of the invention. For example, the 1,12-diaminododecane salt of terephthalic acid could be prepared under autogeneous pressure at temperatures up to about 150° C. in concentration above 7 weight percent. The salt of the modifying acid can be prepared in solution as taught in Example II or isolated from solution as taught in Example III, or both salts can be prepared at elevated temperatures simultaneously, in which case they cannot be isolated but must be used in the ratio on which they are prepared to insure control of the ratio of salts. This invention is further exemplified in the following examples:

EXAMPLE I

Dodecamethylene diammonium salt of terephthalic acid was prepared as follows: To 4000 ml. of water at 85° C. in a five-liter flask was added 136.5 grams (0.822 mol) of terephthalic acid. To the slurry then was added 173 grams (0.865 mol, a 5% excess) of 1,12 - diaminododecane. The mixture was refluxed, at which time all materials went into solution (7 wt. percent solution of salt). Fifteen grams of charcoal (Nuchar C–190, 5 wt. percent was added and refluxing continued for 30 minutes. The solution was filtered hot to remove the charcoal. The filtrate was cooled in ice, and then filtered to remove the crystals of the dodecamethylene diammonium salt of terephthalic acid. The melting point of the salt was 265° C.

EXAMPLE II

Filtrate from Example I was made up to 4000 ml. with water. To the solution at 85° C. in a five-liter flask was added 136.5 grams (0.822 mol) of terephthalic acid (TA–33). To the slurry then was added 173 grams (0.865 mol, a 5% excess) of 1,12-diaminododecane. After solution has been attained, 15 grams (5 wt. percent) of Nuchar C–190 (30 mesh) carbon was added and the solution was refluxed 30 minutes. The solution was filtered hot to remove carbon (it is convenient to divide the solution into two batches to prevent excessive chilling during filtration). The filtered solutions were chilled to give higher precipitation yields. The salt was filtered and washed with acetone to remove any excess amine. The acetone was discarded. The aqueous filtrate was saved for preparation of a new batch. Salt recovery was 280 grams giving a yield of 90.5%.

EXAMPLE III

To 600 ml. of water were added 31.3 grams (0.189 mol) of isophthalic acid and 32.8 grams (0.164 mol) of 1,12-diaminododecane. The isophthalic acid was in 1.5 mol percent excess of total acid in the polymer so as to stabilize the viscosity of the finished polymer. Three grams of decolorizing carbon were added. The mixture was refluxed for one-half hour and filtered.

The solution of the dodecamethylene diammonium salt of isophthalic acid was then added to an autoclave along with 540 grams (1.48 mols) of the dodecamethylene diammonium salt of terephthalic acid.

The slurry of the dodecamethylene diammonium salt of the terephthalic acid in the solution of the dodecamethylene diammonium salt of isophthalic acid and stabilizer was heated under an inert gas blanket in a closed autoclave with gentle agitation until the dodecamethylene diammonium salt of terephthalic acid went into solution. This was indicated by the thermocouples in the autoclave jacket and the internal contents assuming identical readings and this occurred at about 150° C. At this point a homogeneous solution of mixed nylon salts existed.

EXAMPLE IV

Isophthalic acid (53.4 grams, 0.322 mol, 1.8 mol percent excess) and 1,12-diaminododecane (54.6 grams, 0.273 mol) were added to 1000 ml. water. When the solids had gone into the stirred and warmed solution, five grams of charcoal were added. The solution was refluxed 30 minutes, filtered hot, and was then ready to charge to the reactor. To the dodecamethylene diammonium salt of isophthalic acid prepared above was added 900 parts by weight of the dodecamethylene diammonium salt of terephthalic acid prepared as shown in Example I, and .05 parts by weight manganese hypophosphite and a drop of silicone oil. The heat-up time to 230° C. in the closed reactor took 60 minutes, the prepolymerization and water removal at 230° C. took 75 minutes, the reactor temperature was increased to 310° C. in 15 minutes and to further enhance the polycondensation the reactor temperature was maintained at 310–320° C. for 60 minutes. 1000 parts by weight poly(dodecamethylene terephthalamide-dodecamethylene isophthalamide) copolymer was recovered. This product had an inherent viscosity of 0.85 and was used to prepare fibers by the melt spinning method.

EXAMPLE V

Dodecamethylene diammonium hexahydroterephthalate was prepared by adding 172 parts by weight of hexahydroterephthalic acid and 210 parts of 1,12-diaminododecane to boiling water (250 parts). The mixture was refluxed 30 minutes with 19 grams of activated carbon, filtered hot, chilled with ice. Crystals of the dodecamethylene diammonium salt were obtained which melted between 175–180° C.

The following slurry was then charged to an autoclave:

540 grams dodecamethylene diammonium terephthalate
60 grams dodecamethylene diammanium hexahydroterephthalate
4.2 grams hexahydroterephthalic acid
600 ml. water The autoclave was sealed and purged with nitrogen. On heating the autoclave with slow stirring of contents the jacket and internal temperatures came together at 157° C. indicating that the reactor contents had become homogeneous at a solution concentration of 50 weight percent salt. The heat-up time to 230° C. in the closed reactor took 60 minutes, and prepolymerization and water removal at 230° C. took 75 minutes, the reactor temperature was increased to 310° C. in 15 minutes and to further enhance the polycondensation the reactor temperature was maintained at 310–320° C. for 60 minutes at atmospheric pressure. Poly(dodecamethylene terephthalamide-dodecamethylene hexahydroterephthalamide) copolymer was extruded from the reactor. This copolymer is a polymer of poly(dodecamethylene terephthalamide) modified with 10 weight percent hexahydroterephthalamide. The modified polyamide had an inherent viscosity of 0.84 and crystalline melting points 282° C. and 289° C. The molded sample had an unusually high heat distortion temperature of 272° F. at 264 p.s.i. Molding properties of this polymer are presented below:

| | |
|---|---|
| Yield Tensile Strength, p.s.i. (ASTM; D1708) | 8440 |
| Flexural Modulus (ASTM; D790) | 394,000 |
| Flexural Strength (ASTM; D790) | 11,700 |
| Tensile Impact Strength, ft.lbs./in. (ASTM; D1822) | 9.48 |
| Izod Impact, ft.lbs./in. (ASTM; D256) | 1.6 |
| Hardness, Rockwell (ASTM; D785) | 73R |
| Heat Distortion T, °F. at 264 p.s.i. (ASTM; D648) | 272 |
| Inherent Viscosity (ASTM; D1601) | 0.84 |

The heat distortion temperature of the modified poly(dodecamethylene terephthalamide) is particularly noteworthy.

EXAMPLES VI to XI

Following the process and reaction conditions of Example IV, except for varying the amount of viscosity stabilizer, produced the following effect on molecular weight of the copolyamide as measured by inherent viscosity (measured in trifluoroacetic acid at 30° C., 0.1 g. sample/25 ml.).

| Example | Mol percent viscosity stabilizer isophthalic acid | Stabilizer acid | Inherent viscosity | $T_g$, °C. | $T_m$, °C. |
|---|---|---|---|---|---|
| VI | 1.5 | Isophthalic | 0.92 | 180 | 279, 291 |
| VII | 1.8 | do | 0.85 | 180 | 280, 288 |
| VIII | 2.0 | Terephthalic | 0.74 | 180 | 280, 288 |
| IX | 3.0 | do | 0.68 | 180 | 280, 290 |
| X | 5.0 | do | 0.49 | | |
| XI | 8.0 | do | Brittle | | |

Note: $T_g$=glass transition temperature; $T_m$=crystalline melting point.

EXAMPLE XII

The polymer prepared in Example IV was melt spun according to the following procedure:

The chopped and dried resins were extruded in a ¾ inch Killion extruder through a 16-orifice, 12-mil spinneret with a 4:1 L/D ratio. The melt temperature was about 320° C., the feed rate was about 2 to 2.1 pounds per hour and the take-up rate was about 1350 feet per minute. The multifilament yarns were drawn over a heated shoe at 190–195° C. The tensile properties of yarns drawn at various draw ratios are given below:

Tensile properties of poly(dodecamethylene terephthalamide) modified with 10 mol percent poly(dodecamethylene isophthalade)

| Ratio | Draw temp., °C. | Denier | Tenacity, g./d. | Elongation at break, percent | Modulus, g./d. |
|---|---|---|---|---|---|
| 3.5 | 190 | 6.0 | 5.0 | 21 | 48 |
| 4.0 | 190 | 5.8 | 5.9 | 14 | 57 |
| 2.7 | 195 | 8.2 | 3.2 | 55 | 41 |
| 3.5 | 195 | 5.3 | 5.6 | 15 | 49 |
| 3.0 | 195 | 7.7 | 4.2 | 27 | 51 |
| 2.7 | 195 | 7.4 | 4.6 | 20 | 57 |

EXAMPLE XIII

The properties of a yarn sample from the poly(dodecamethylene terephthalamide - dodecamethylene isophthalamide) copolymers which was prepared as shown in Example IV are given below:

| | |
|---|---|
| Denier | 8.1 |
| Tenacity, g./d. | 3.3 |
| Elongation at break, percent | 48 |
| Initial modulus, g./d. | 45 |
| Modulus at 3%, g./d. | 36 |
| Modulus at 5%, g./d. | 24 |
| Modulus at 10%, g./d. | 23 |
| Work to break, g.-cm./d.-cm. | 0.82 |
| Loop strength, g./d. | 2.7 |
| Knot strength, g./d. | 3.2 |
| Boil-off shrinkage, percent | 8.7 |
| Birefringence | 0.078 |
| Refractive Index | 1.557 |

The draw ratio for this yarn was 2.7 and draw temperature was 195° C.

Work to break is the area under the stress-strain curve and is related to the toughness of the samples. Loop and knot strengths are a measure of brittleness and should be within 90% of the tenacity. The boil-off shrinkage is determined by boiling a measured length of fiber in water for thirty minutes and drying. The shrinkage depends on heat-set and other variables and should be about 8% to tighten the yarn and average out variations. Birefringence is a measure of orientation. It is the difference in refractive index along the fiber and across the fiber divided by the fiber diameter. The average refractive index is a measure of crystallinity and is affected by heat set and draw ratio.

Density was determined with a gradient density column prepared with xylene and diethyl phthalate. Measurements were made at 23° C. on six fibers conditioned at 65% R. H. and 23 C. Moisture regain was determined by distillation in toluene according to ASTM Method D 2654–Option 3.

The dyeability of poly(dodecamethylene terephthalamide-dodecamethylene isophthalamide) was studied by dyeing knitted tubing made from oriented yarn. The yarn was scoured prior to dyeing in 0.02% trisodium phosphate and 0.5% Triton X 100 for 30 minutes at 80° C. The scoured tubing was dyed at the temperatures and times recommended by the manufacturers of the respective dyes. The results follow.

| Dye class | Trade name | Results |
|---|---|---|
| Acid | Merpacyl Blue SW | Good. |
| Basic | Eastacryl Blue 5GL | Do. |
| Disperse | Mafon Blue 366 | Do. |
| Neutral-metallized | Isolon Red 2G | Fair. |
| Reactive (acid) | Procion Brill Blue H7G | Do. |
| Do | do | Do. |

EXAMPLE XIV

A poly(dodecamethylene terephthalamide) modified with 20 weight percent isophthalamide was prepared as follows:

To a stirred autoclave was added a slurry of 1000 parts of water, 800 parts of dodecamethylene diammonium terephthalate, 200 parts of dodecamethylene diammonium isophthalate, and 8 parts of isophthalic acid. While moderately stirring the autoclave the reactor was purged with nitrogen and heated to a temperature of 150° C. under autogeneous pressure to produce a homogeneous solution of salts. Polymerization was started by raising the temperature to 230°. Pressure was released slowly over a 75-minute period at this temperature. Temperature was then raised to 318° C. and held with stirring for one hour. The resulting polymer was extruded from the reactor. The inherent viscosity was 0.80, the crystalline melting point was 274° C. and the glass transition temperature was 128° C. The polymer was chopped and then spun and drawn to a useful fiber.

EXAMPLE XV

The poly(dodecamethylene terephthalamide) polymer randomly modified with 10 mol percent isophthalamide as prepared in Example IV was cast to a six micron film by the following procedure:

Ten grams of polymer was dissolved in 50 ml. trifluoroacetic acid on warming. The solution was spread onto a glass plate by means of a Bird film application bar. When solvent was removed slowly an opaque crystalline film was obtained which was brittle and had poor crease resistance. Rapid removal of solvent by vacuum drying resulted in a clear strong film which was easily peeled from the glass. The film had excellent crease resistance.

What is claimed is:

1. A high molecular weight fiber-forming poly(dodecamethylene terephthalamide) copolymer having a glass transition temperature above 100° C. which consists essentially of recurring units of (a) dodecamethylene terephthalamide and (b) a modifying amide selected from the group consisting of dodecamethylene isophthalamide [dodecamethylene t-butylisophthalamide] and dodecamethylene hexahydroterephthalamide wherein the copolymer contains 75 to 95 mol percent dodecamethylene terephthalamide structures and 25 to 5 mol percent of structures selected from the group consisting of dodecamethylene isophthalamide [dodecamethylene t-butylisophthalamide] and dodecamethylene hexahydroterephthalamide.

2. A fiber of the polymer of Claim 1.
3. A film of the polymer of Claim 1.
4. A filament of the polymer of Claim 1.
5. A high molecular weight fiber-forming poly(dodecamethylene terephthalamide - dodecamethylene isophthalamide) copolymer having a glass transition temperature above 100° C. which consists essentially of recurring units of (a) structures containing dodecamethylene terephthalamide and (b) structures containing dodecamethylene isophthalamide wherein the copolymer contains 75 to 95 mol percent dodecamethylene terephthalamide structures and 25 to 5 mol percent dodecamethylene isophthalamide structures.
6. A high molecular weight fiber-forming poly(dodecamethylene terephthalamide-dodecamethylene hexahydroterephthalamide) copolymer having a glass transition temperature above 100° C. which consists essentially of recurring units of (a) structures containing dodecamethylene terephthalamide and (b) structures containing dodecamethylene hexahydroterephthalamide wherein the copolymer contains 75 to 95 mol percent dodecamethylene terephthalamide structures and 25 to 5 mol percent dodecamethylene hexahydroterephthalamide structures.
7. A fiber of the polymer of Claim 6.
8. A film of the polymer of Claim 6.
9. A filament of the polymer of Claim 6.
10. A fiber-forming copolyamide consisting essentially of (a) 75 to 95 mol percent dodecamethylene terephthalamide units and (b) 25 to 5 mol percent dodecamethylene hexahydroterephthalamide units.

References Cited

UNITED STATES PATENTS

| | | | |
|---|---|---|---|
| 2,715,620 | 8/1955 | Carlston et al. | 260—78 R |
| 2,965,616 | 12/1960 | Caldwell et al. | 260—78 |
| 3,565,874 | 2/1971 | Ridgway | 260—78 |
| 3,642,710 | 2/1972 | Keen et al. | 260—78 |
| 3,696,074 | 11/1972 | Tsuda et al. | 260—78 |

HAROLD D. ANDERSON, Primary Examiner

U.S. Cl. X.R.

8—178 R; 260—31.2 N, 78 S; 264—176 F

PO-1050
(5/69)

UNITED STATES PATENT OFFICE
CERTIFICATE OF CORRECTION

Patent No. 3,833,547           Dated   September 3, 1974

Inventor(s)   Steitz, Alfred, Jr.

It is certified that error appears in the above-identified patent and that said Letters Patent are hereby corrected as shown below:

Title - "Product and Process" not printed on patent

Line 10 - Abstract of the Disclosure - should be Abstract of Disclosure

Column 6, line 47 in the title "Tensile Properties of Poly(dodecamethylene terephthalamide) modified with 10 mol % poly(dodecamethylene isophthalade)" Should be Tensile Properties of Poly(dodecamethylene terephthalamide) modified with 10 mol % poly(dodecamethylene isophthalamide)per specification page 11, line 10.

In the Claims:

Claim 1 - Column 8 - line 12 the words "dodecamethylene t-butylisophthalamide" are in brackets, they should be taken out.
Ditto same for lines 17 and 18, Column 8, as per specification "insert B1."

Signed and sealed this 15th day of April 1975.

(SEAL)
Attest:

RUTH C. MASON
Attesting Officer

C. MARSHALL DANN
Commissioner of Patents
and Trademarks